Figure 1:
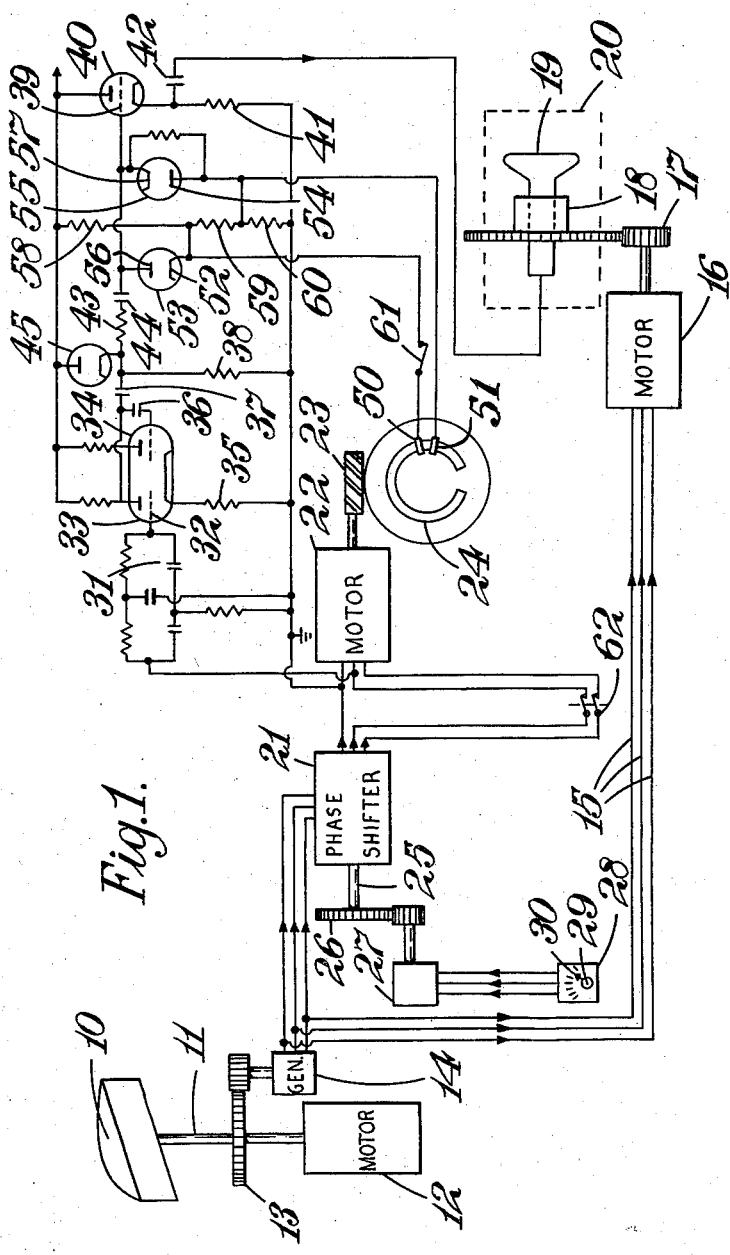

Oct. 28, 1958     M. H. EASY ET AL     2,858,532
RADAR SYSTEMS EMPLOYING ROTATING ANTENNA
Filed Feb. 27, 1956                    4 Sheets-Sheet 1

INVENTORS
M. H. EASY +
A. P. TUTHILL
By Mawhinney & Mawhinney
ATTYS.

Oct. 28, 1958 M. H. EASY ET AL 2,858,532
RADAR SYSTEMS EMPLOYING ROTATING ANTENNA
Filed Feb. 27, 1956 4 Sheets-Sheet 2
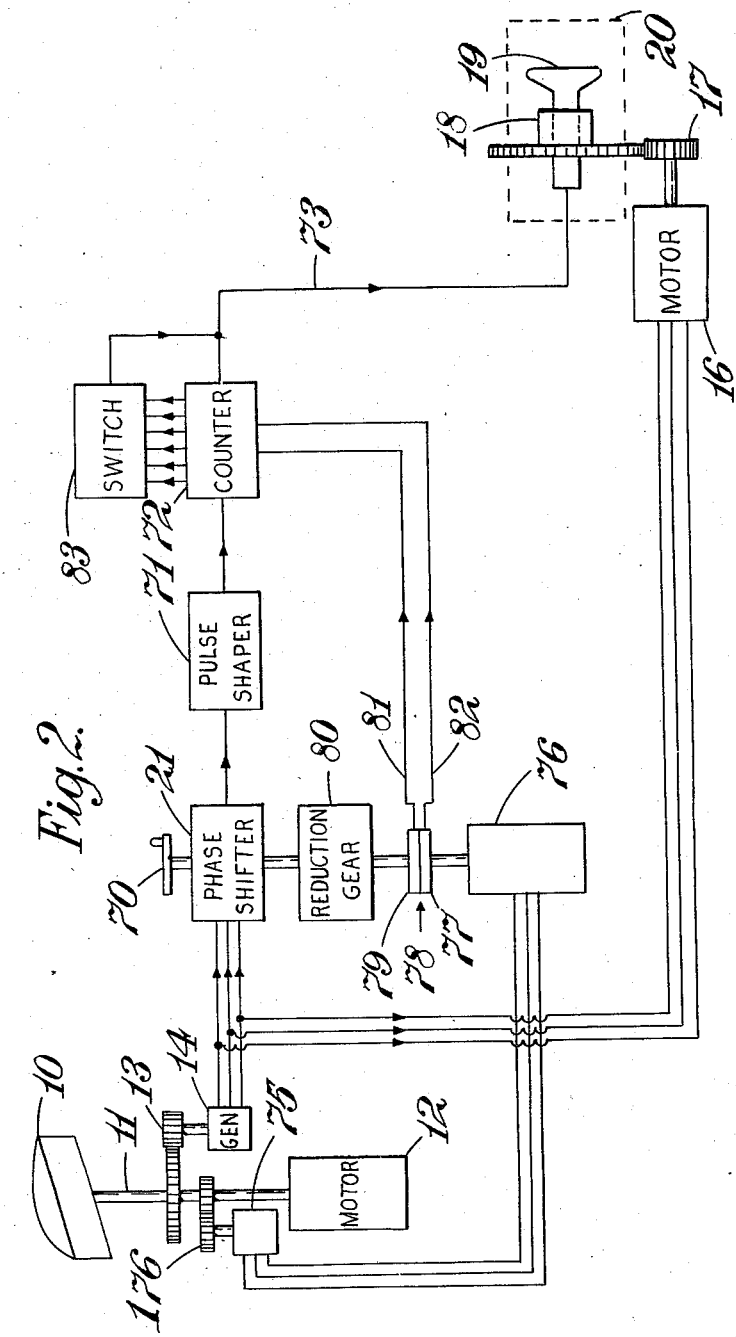
INVENTORS
M. H. EASY +
A. P. TUTHILL
By Mawhinney & Mawhinney
ATTYS.

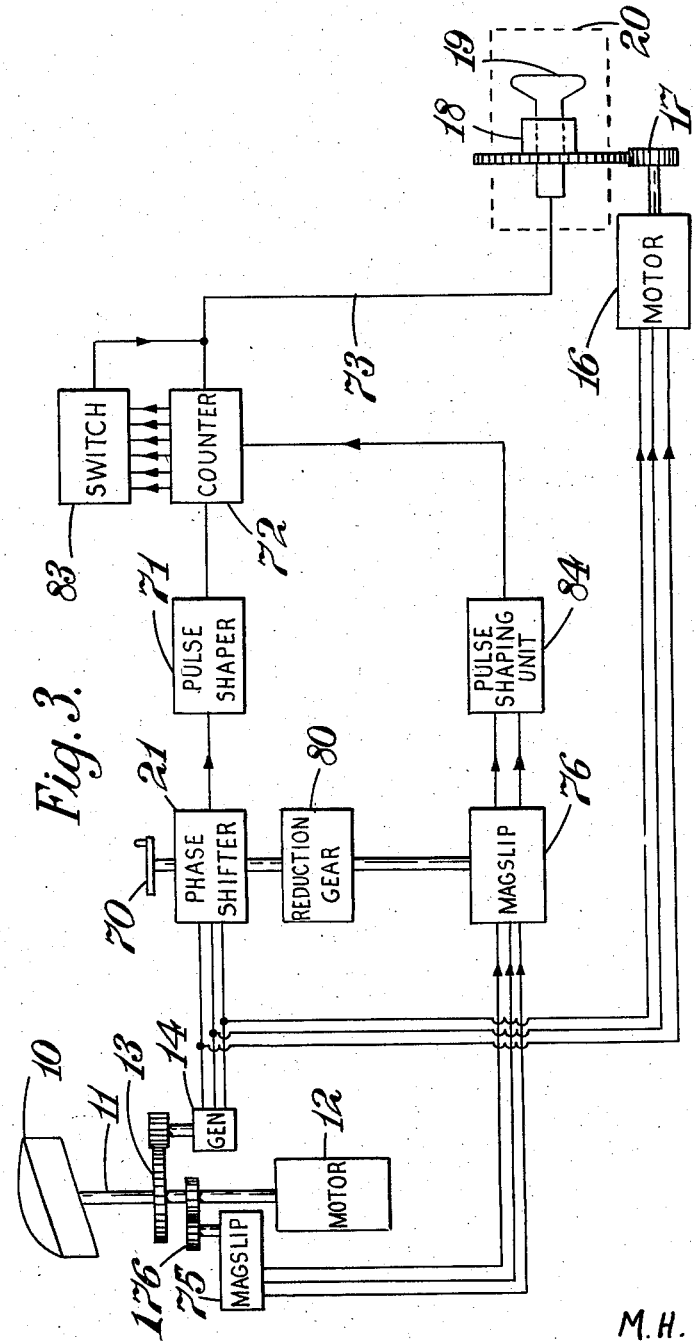

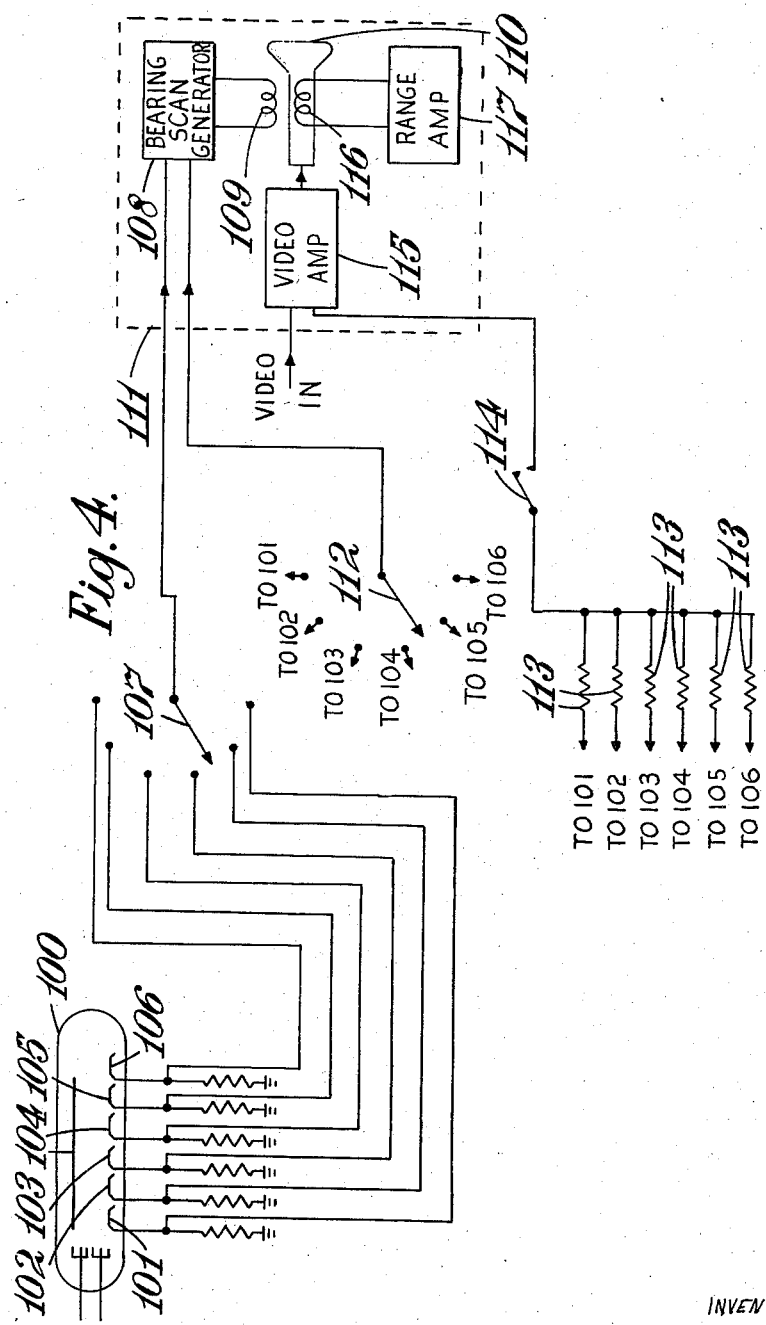

United States Patent Office 2,858,532
Patented Oct. 28, 1958

2,858,532

RADAR SYSTEMS EMPLOYING ROTATING ANTENNA

Maurice Henry Easy and Anthony Peter Tuthill, London, England, assignors to The Decca Record Company Limited, London, England, a British company Application February 27, 1956, Serial No. 567,891

Claims priority, application Great Britain February 28, 1955

17 Claims. (Cl. 343—11)

This invention relates to radar systems employing a continuously rotating antenna and an indicator having a screen on which a trace is moved in synchronism with the rotation of the antenna. The direction of a radar response in such a radar system may be determined by observation of the position of the trace on the indicator screen at the instant of reception of a particular signal because the position of the trace corresponds to the instantaneous direction of the antenna. The position of the trace, heretofore, has usually been determined by means of a bearing scale adjacent the indicator. The measurement of the bearing may be facilitated, however, by the provision of means for producing a second trace on the screen to form a bearing marker, the position of which may be manually or automatically adjusted.

According to this invention in a radar system employing a continuously rotating antenna, there is provided an alternating current generator driven by the antenna or driven in synchronism therewith to generate an alternating current of which the frequency is a known multiple ($k$) of the frequency of rotation of the antenna, an indicator having a screen on which the trace is moved in synchronism with the rotation of the antenna so that the instantaneous position of the trace on the screen is representative of the corresponding instantaneous angular position of the antenna, a pulse generator energised from said alternating current generator to produce short duration pulses in synchronism with the cycles of alternating current fed to said pulse generator, circuit means including a phase shifter for feeding alternating current from said alternating current generator to said pulse generator whereby the phase of the alternating current fed to said pulse generator from said alternating current generator may be altered and selector means arranged to select one or more pulses produced by said pulse generator in each antenna rotation to provide an antenna position marker pulse or pulses. By rotating the phase shifter, the phase of the pulses with respect to the cycles of alternating current and hence with respect to the angular position of the antenna may be altered. Since the alternating current has a frequency which is a multiple $k$ of the frequency of rotation of the antenna, the number of pulses occurring in each cycle of rotation of the antenna will be equal to $k$ and the selector means enables the required pulse or pulses of the $k$ possible pulses to be selected. Circuit means may be provided for applying the selected pulse or pulses to the indicator to provide an antenna position marker or markers by modifying the trace on the screen, for example by brightening the trace and hence, in this arrangement, there is produced a marking or markings on the screen of which the position depends on which of the $k$ cycles per antenna rotation is or are selected and on the degree of phase shift introduced by said phase shifter. The phase shifter may be calibrated so that the modifications of the trace may be adjusted to correspond to any desired angular position of the antenna.

Generally it will be required to arrange the selector means to select one pulse in each complete cycle of antenna rotation so that only one modification of the trace is visible on the indicator screen. In some cases, however, it may be desirable for two or three successive pulses in each complete cycle of antenna rotation to be made visible on the trace of the screen. Provision may be made for cutting the selector means out of circuit so that all the pulses are fed to the cathode-ray tube for facilitating initial setting-up of the apparatus.

It will be understood that the pulse length is not critical; assuming that the trace is brightened, the pulse length is preferably sufficiently long that the whole trace is brightened but it should be very short compared with the period of revolution of the antenna to avoid giving a broad line on the screen.

It will be understood that the selector means may be electrical or mechanical or an electro-mechanical combination.

In one arrangement the aforementioned selector means comprises a rotary switch having a fixed contact member and a movable contact member, the movable contact member being driven by a synchronous electric motor from the alternating current output from said phase shifter. When the selector means is to select only one pulse in each complete cycle of antenna rotation, said synchronous motor is conveniently arranged to drive the movable contact member of said switch through reduction gearing having a ratio such that, apart from variations due to the movement of the phase shifter, the movable contact member is rotated at the same speed as the antenna. A similar arrangement may be used if two or three successive pulses are to be selected during each cycle of antenna rotation.

In another arrangement, the aforemetnioned selector means may comprise a rotary switch having two relatively rotatable contact members, one of said contact members being coupled to said phase shifter to be rotated through an angle equal to the angular shift of the marker pulse effected by any adjustment of the phase shifter, and the other contact member being continuously driven in synchronism with and at the same speed as the antenna. Said other contact member may conveniently be driven from the antenna by a magslip system.

Either of the aforementioned types of rotary switch may comprise a blanking switch arranged to complete a control circuit during the periods necessary for passing the required bearing marker or markers. Preferably, however, the rotary switch is arranged to interupt a diect current control circuit during the periods necessary for passing the required bearing marker or markers, said direct current control circuit being arranged to control, by means of an electronic switch, the application of the bearing marker pulses to the indicator.

Instead of making use of a switch in a circuit through which the pulses are applied to the indicator, the aforementioned selector means may comprise a counter arranged to count pulses in successive groups of pulses from said pulse generator whereby one or more pulses out of each group may be selected, a re-set control device driven directly or indirectly from the antenna to produce a control pulse when the antenna is in a predetermined angular position or positions and circuit means for applying said control pulses to said counter to reset the counter whereby counting of pulses starts when the antenna is in said predetermined position or positions. By this arrangement, there is provided one or more identified pulses corresponding to one or more selected angular positions of the antenna, and these, when applied to the screen, provide angular direction marker indications. Furthermore, although particular pulses are selected, all the pulses are still available so that it is possible to apply to the screen a series of marks with one or more marks made identifiable as representing some particular angular position or positions of the antenna. The use of the counter together with the re-setting circuit ensures that the counting of the pulses to produce the particular selected pulse always starts from the correct datum.

The re-set control device may comprise a mechanical switch or it may comprise a suitable pulse producing circuit, such as is hereinafter described, to produce the required control pulse. In either case, a differentiating circuit may be provided for differentiating the control pulses from said re-set control device before the pulses are applied to said counter. If this is done, the duration of the switch closure, if a mechanical switch is employed, is immaterial. To ensure that the counter does not miss a pulse from the pulse generator, the phase of the pulse generator output should be arranged so that the pulses therefrom do not occur during the duration of the effective switching pulse, that is to say the above-mentioned short duration pulse derived from the switch output or the switch closure period if the switch output is used directly to re-set the counter.

If it is desired to alter the phase of the marker indication or indications on the screen with respect to the angular position of the antenna, it would be necessary, in this case, to shift the phase of the pulses by the appropriate amount and also to alter the angular position of operation of said contacts (with respect to the antenna position) by the appropriate angle.

The re-set control device may comprise a rotary switch having a fixed contact member and a movable contact member, the movable contact member being driven by a synchronous electric motor from the alternating current output from said phase shifter. Alternatively the re-set control device may comprise a rotary switch having two relatively rotatable contact members, one of the contact members being coupled to said phase shifter to be rotated through an angle equal to the angular shift of the marker pulse effected by any adjustment of the phase shifter and the other contact member being continuously driven in synchronism with and at the same speed as the antenna. It may be preferable in some cases to avoid the use of continuously driven rotary switches and this may be done by providing, as said reset control device, a magslip transmitter arranged so that its rotor is rotated in synchronism with and at the same speed as the antenna, a magslip receiver having its stator electrically connected to the stator of the magslip transmitter, means coupling the rotor of the magslip receiver to said phase shifter to be rotated through an angle equal to the angular shift of the marker pulse effected by any adjustment of the phase shifter and a control circuit arranged to produce pulses, constituting said control pulses, corresponding to one of the two characteristic nulls per revolution of the antenna of the voltage produced in the rotor of the magslip receiver. This arrangement readily permits of the production of control pulses with an accuracy equal to or greater than is possible with rotary switches.

The aforementioned counter is preferably arranged to count the total number of pulses in each antenna rotation and also to count groups of pulses containing equal integral sub-multiples of the total number of pulses produced in one revolution of the antenna. For example, pulses might be produced at every 5 degrees of rotation of the antenna, that is to say there will be 72 pulses produced for each complete revolution of the antenna. The counter might then be arranged to count groups of twelve pulses so as to produce selected pulses thus identifying the pulses representing each 60 degrees of rotation.

In order to avoid any ambiguity, the counter is preferably arranged to count the total number of pulses in one revolution of the antenna and said re-set control device is arranged to operate, to produce a control pulse, in only one angular position in each revolution. Thus, using the figures quoted in the above example, the selected pulses at every 60 degrees might be further counted in groups of six so that one particular selected pulse is produced once per revolution.

Marker pulses occurring at more frequent intervals than those corresponding to the successive cycles of the alternating current generator output can be obtained if required. For example, a polyphase supply might be obtained from the alternating current generator and trains of pulses derived from each phase of the output. Thus, using the particular figures mentioned before, a five phase output would be provided to give markers corresponding to every degree of rotation. In general, the $n$-phases required for a system having a basic ratio of $n$ degrees per cycle may be obtained from two transformers in a modified Scott connection using a two-phase alternating current generator driven by or in synchronism with the antenna, each required phase output being synthesised from its sine and cosine components. This arrangement can very conveniently be used with the phase shifted resetting counters since the two transformers can be energised from the output of the phase shifter so that the 1 degree pulses will therefore move with the others.

The counting device might conveniently employ gas-filled counting tubes and, in the case of the specific example quoted above, two such gas-filled counting tubes might be employed, the first being arranged to count the 5 degree pulses in groups of twelve and the second to count the output from one cathode of the first counting tube (i. e. 60 degree pulses) in groups of six. Using such gas-filled counting tubes, any selected or all the various pulses may be obtained by making connections to the appropriate cathodes and hence marker indications can be selected as required. The pulse outputs are conveniently used to provide brightened marker traces on the screen as bearing markers. The 60 degree marker traces (or any other selected traces) might be made distinctive on the screen by being brighter than the 5 degree or 10 degree marker traces which would be obtained from the first counting tube if a complete web of, for example, 5 or 10 degree and 60 degree marker traces is required.

The invention is particularly of value in radar apparatus in which the position of a target has to be determined very accurately. For this purpose the indicator screen may have an enlarged display showing only a selected portion of the region swept by the radar beam using, for example, an off-centered plan position indicator display or a B-scope display. The present invention enables a marker trace to be put on the indicator screen, which trace is adjustable in position to correspond to any bearing of the radar antenna. As a particular example, if the alternating current generator was driven (e. g. by suitable gearing from the antenna) so that it produced 72 cycles for each rotation of the antenna, the bearing marker traces would be only 5 degrees apart. Thus one cycle of phase shift would move the trace by an amount corresponding to only 5 degrees of antenna rotation. If necessary, higher ratios could be employed without any difficulty and hence it is readily possible to enable the bearing marker trace to be accurately adjusted in position to a fraction of a degree. The marker trace can be aligned with the target and hence the bearing of the target can be determined by the phase shifter setting. It will be appreciated that the accuracy of indication is wholly independent of the amount of off-centering or other displacement of the display.

The invention also includes within its scope, a radar system wherein scanning movement of the trace across the screen of the indicator comprises a repetitive scan initiated and also possibly terminated by pulses from said selector means. In such an arrangement, switching means may be provided to allow any selected marker pulse to initiate the bearing scan and any other chosen pulse to terminate the bearing scan. Where other marker pulses occur during such a bearing scan, they may be displayed as modifications of the trace to form bearing markers.

The provision of a heading marker controlled by a contact operated by the antenna (as for example in the manner described in the specification of British Patent No. 664,858) facilitates the setting up of the arrangement described in the present specification. Such a heading marker provides an indication on the screen of the tube when the antenna is at some known direction. The bearing marker trace can be aligned with this direction and the scale on the phase shifter checked (and corrected if necessary) to correspond to the reading for this direction.

As indicated above, in its simplest form the phase shifter is provided with a calibrated scale. It is, however, possible to provide a remotely controlled phase shifter and either a remote indication of the phase shifter setting may be provided or, if the display covers a fixed region, a bearing scale may be provided adjacent the screen of the cathode-ray tube.

This invention is particularly applicable to radar systems employing rotating antenna and having apparatus, such as is described and claimed in the aforementioned British Patent No. 664,858, for rotating the deflection coil holder of a plan position indicator in synchronism with the rotation of the antenna, which apparatus comprises an alternating current generator driven by and synchronised with the antenna to produce an alternating current having a frequency which is a multiple of the speed of antenna rotation, an asynchronous-starting synchronous motor energised by said alternating current, drive means coupling the motor to the deflection coil holder to rotate the latter at the speed of rotation of the antenna and means for adjusting the angular position of the deflection coil holder to correspond with the angular position of the antenna. In such aparatus the alternating current generator may be used not only for rotating the deflection coil holder but also as the generator for the marker traces of the present invention.

The following is a description of a number of embodiments of the invention, reference being made to the accompanying drawings in which:

Figures 1, 2 and 3 are diagrammatic representations of three different arrangements for providing adjustable bearing marker traces on the indicator screen of a radar system; and Figure 4 is a diagram illustrating a modification of the arrangements of Figures 2 and 3.

Referring to Figure 1, there is illustrated diagrammatically a radar antenna 10 mounted on a shaft 11 which is continuously rotated by a motor 12. The shaft 11 is coupled by step-up gearing 13 to drive an alternating current generator 14 which generates one cycle per revolution of its shaft. It will be assumed in the following description that this gearing 13 has a step-up ratio of 72:1 so that the generator 14 will produce 72 cycles for each revolution of the antenna shaft 11. The output of the generator, which may conveniently be a two phase generator, is fed by leads 15 to an asynchronous-starting synchronous motor 16 which, through a 72:1 reduction gear 17, drives a rotatable deflection coil holder 18 around the neck of a cathode ray tube 19 forming part of a plan position indicator 20 for the radar system. Such an arrangement employing a generator and an asynchronous-starting synchronous motor is described and claimed in British patent specification No. 664,858 and reference may be had to the specification for further details of this part of the system. As is described in that specification either manual or automatic means may be provided for adjusting the angular position of the deflection coil holder to correspond with the angular position of the antenna.

Part of the output of the generator 14 is also fed through a phase shifter 21 to another synchronous motor 22 which, through a 72:1 reduction gear 23, drives a movable contact member 24 of a rotary switch. Thus, provided no adjustment is made to the phase shifter 21, the movable contact member 24 of the switch will rotate at the same speed as and in synchronism with the rotation of the antenna 10. The phase shifter 21 can be adjusted by means of an input control shaft 25. To provide for remote control of the phase shifter, this shaft 25 is driven through gearing 26 from the rotor of a magslip receiver 27. The position of this rotor is remotely controlled by means of a magslip transmitter 28 having a manual control member 29 movable over a calibrated scale 30.

One phase of the output of the phase shifter 21 is applied through a filter 31 to the input grid 32 of a triode 33. This triode 33 is connected together with a further triode 34 to form a flip-flop circuit, the two triodes having a common cathode load resistance 35 and the anode of triode 33 being coupled through a condenser 36 to the grid of triode 34. This flip-flop circuit produces a series of pulses corresponding to and synchronized with the cycles of the output from the phase shifter 21. These pulses are applied through a differentiating circuit, comprising a condenser 37 and a resistor 38, to the grid 39 of a further triode 40 via a resistor 43 and a condenser 44. A diode 45 short-circuits the negative-going train of pulses resulting from differentiation. The triode 40 is connected as a cathode follower and its output is developed across a cathode load resistance 41 in the form of output pulses corresponding to the input pulses applied to grid 39. This output is applied through a condenser 42 to the grid to cathode circuit of the aforementioned cathode ray tube 19 in such sense that the output pulses brighten the trace on the screen of the cathode ray tube 19.

The aforementioned movable contact member 24 cooperates with a pair of fixed contacts 50, 51 to form a rotary switch completing a circuit between the two contacts 50, 51 except over a small fraction of the angular rotation of the movable contact member 24. The contacts 50, 51 are connected respectively to the cathode 52 of a diode 53 and the anode 54 of a diode 55. These two diodes together form an electronic switch for controlling the application of pulses from the differentiating circuit 37, 38 to the grid 39 of the valve 40. For this purpose the anode 56 of diode 53 and the cathode 57 of diode 55 are connected to the grid 39 of the valve 40. The cathode 52 and the anode 54 are connected respectively to different points on a potentiometer network formed by resistors 58, 59 and 60 so that diode 53 prevents the voltage on grid 39 from rising above the potential of the higher voltage end of resistor 59 whilst diode 55 prevents the voltage on grid 39 from falling below the potential of the lower voltage end of resistor 59. Thus when the contacts 50, 51 are connected together, so short-circuiting the resistor 59, no pulses are applied to the grid 39. It will thus be seen that output pulses from the differentiating circuit 37, 38 are applied to the grid 39 of the valve 40 only when the movable switch contact member 24 is in an angular position such that no circuit is completed between contacts 50, 51. A normally closed press button switch 61 is provided in series with the circuit from contact 50 to cathode 52 so that, if desired, all the output pulses from the differentiating circuit 37, 38 may be applied to the grid 39 of the valve 40 and hence to the cathode ray tube 19.

It will be seen that the generator 14 produces an output alternating current having a frequency which is a multiple of the speed of rotation of the antenna 10 and is synchronised therewith. This output is used to drive the deflection coil holder 18 so that the trace on the screen of the cathode ray tube 19 is rotated in synchronism with the antenna. The flip-flop formed by triodes 33, 34 together with the differentiating circuit 37, 38 produces a series of pulses corresponding to the cycles of the output of the generator 14 but shifted in phase relative thereto by an amount dependent on the setting of the phase shifter 21. If the generator 14 produced 72 cycles for each revolution of the antenna 10, there will thus be 72 output pulses from the differentiating circuit 37, 38 and, neglecting for the moment the electronic switch formed by diodes 53, 54, these output pulses will be applied by means of valve 40 to the grid to cathode circuit of the tube 19 so that the trace on the screen of the tube would be brightened at each 5° of bearing. The exact position of these bearing markers may be altered by adjustment of the phase shifter 21, this adjustment being effected remotely by means of the control member 29 of the magslip transmitter 28. It is thus possible to adjust these bearing markers to correspond to any required angular position on the indicator screen. The rotary switch formed by contact members 24 and 50, 51 together with the electronic switch formed by diodes 53, 55 in combination with resistance 43 permits the passage of one, or possibly two or three, of the pulses in each cycle of rotation of the antenna to the grid 39 of the valve 40 so that only one, or possibly two or three, of the bearing marker traces are displayed on the screen of the cathode ray tube 19. To facilitate coarse adjustment of the position of the selected bearing marker or markers, a normally closed manually operable switch 62 is provided in the circuit from the phase shifter 21 to the motor 22.

Figure 2 illustrates another embodiment of the invention. The same reference characters will be used in Figure 2 as in Figure 1 to indicate corresponding components. As in the arrangement of Figure 1 the antenna 10 is mounted on a shaft 11 which is continuously rotated by a motor 12. The shaft 11 is coupled by step-up gearing 13 to an alternating current generator 14 which feeds an asychronous-starting synchronous motor 16 driving, through a reduction gear 17, the deflection coil holder 18 around the neck of a cathode ray tube 19 forming part of the plan position indicator 20 of the radar system. Either manual or automatic means may be provided for adjusting the angular position of the deflection coil holder to correspond with the angular position of the antenna. Reference may be made to the specification of the aforementioned British Patent No. 664,858 for a further description of this arrangement for rotating the deflection coil holder in synchronism with the antenna.

Part of the output of the generator 14 in Figure 2 is fed to a phase shifter 21 so that the phase of the output of the phase shifter may be varied by rotation of a manual control handle 70. Provision, however, may be made for remote control of the phase shifter as in the arrangement of Figure 1. It will be assumed, as before, that the gearing 13 provides a step-up ratio of 72:1 so that the output from the generator 14 and hence from the phase shifter 21 will have 72 complete cycles to each revolution of the antenna 10, that is to say, a pulse occurs for each 5° of antenna rotation. This output from the phase shifter is fed through a pulse shaper 71 to produce short duration pulses corresponding to the cycles of the phase shifter output and these pulses are fed into a counter 72. This counter 72 conveniently employs gas-filled counting tubes such as the tubes known under the trademark Dekatron and, with the particular step-up gear ratio mentioned above, may conveniently employ two such counting tubes, the first being arranged to count the pulses (which occur each five degrees of rotation of the antenna) in groups of 12 and the second to count the output from one cathode of the first counting tube (i. e. 60° pulses) in groups of six. If an output is taken from one cathode of the second counting-tube, this will give one pulse in each revolution of the antenna. Using such gas-filled counting tubes, any selected or all of the various pulses can be obtained by making connections to the appropriate cathodes and hence marker indications can be selected as required. The output from the counter is fed through a lead 73 to be applied between the cathode and grid of the cathode ray tube 19 so as to provide a brightened marker trace on the screen of the tube as a bearing marker. The 60° marker traces (or any other selected traces) might be made distinctive on the screen by being brighter than the 5° or 10° marker traces which can be obtained from the first counting tube if a complete web of, for example, 5° or 10° and 60° marker traces is required.

It will be appreciated that, if a counter such as has thus far been described is employed, the counting might start from any pulse. In order to ensure that counting starts from some predetermined angular position of the antenna, reset means are provided for automatically resetting the counter if necessary. For this purpose there is provided a magslip transmitter 75 driven from the antenna shaft 11 by 1:1 gearing 176. This magslip transmitter 75 is arranged to drive a magslip receiver 76 the rotor of which is coupled to a rotatable contact member 77 of a rotary switch 78. This switch 78 has two relatively movable contact members, the second contact member 79 being driven through a reduction gear 80 from the mechanical input to the phase shifter 21. The reduction gear 80 has a 72:1 ratio, corresponding to that employed in the step-up gearing 13, so that the movable contact member 79 is rotated through an angle corresponding to the angular change in bearing indication effected by any adjustment of the phase shifter 21. The rotary switch 78 is arranged to complete a circuit between leads 81, 82 so as to provide a resetting pulse once in each cycle of rotation of the antenna 10. Any adjustment of the phase shifter will alter the phase of the resetting pulse by the appropriate amount and thus the resetting pulse will occur at a predetermined period in one particular cycle out of each 72 cycles of the output of the phase shifter 21. The resetting pulse is arranged so that it does not coincide with the pulses from the pulse shaper 71 so as to ensure that the counter does not miss a pulse from the pulse shaper due to any coincidence with the resetting pulses. If necessary the output from the rotary switch may be applied to a differentiating circuit in order to provide a short duration resetting pulse so that the actual duration of the closure of the contacts of the switch 78 is immaterial.

Normally only one or perhaps two or three bearing marker indications are fed to the cathode ray tube 19 but provision may be made, by means of a switch 83, for applying a number of chosen pulses from the counter 72 to the cathode ray tube 19 so that a complete network of bearing marker lines is obtained on the screen of the tube.

Figure 3 illustrates a modification of the arrangement of Figure 2 and like reference numerals are used to indicate corresponding components. In the following description, reference will be made only to those parts which differ from the arrangement of Figure 2. In the arrangement of Figure 3 the stator of the magslip transmitter 75 is connected to the stator of the magslip receiver 76. The rotor of the magslip receiver 76, however, is not allowed to take up an angular position determined by the stator currents but is mechanically connected to the output shaft of the reduction gear 80 so that it has an angular position dependent on the setting of the phase shifter 21. With this arrangement there will in general be a voltage developed in the rotor winding of the magslip 76. This voltage will fall to zero when the magslip receiver rotor is in either of two angular positions, spaced 180° apart, which correspond to the instantaneous setting of the magslip transmitter rotor and hence to angular positions of the antenna. The actual antenna positions at which this voltage is zero will however depend on the setting of the receiver rotor and hence on the setting of the phase shifter 21. The rotor winding of the magslip 76 is connected to a pulse shaping unit 84 which is arranged to produce a short duration pulse as a magslip rotor voltage passes through zero and the pulses from the pulse shaping unit 81 are applied as resetting pulses.

to the counter 72 in a similar manner to the pulses obtained from the switch 78 of Figure 2. Apart from this different arrangement for producing the resetting pulses, the system of Figure 3 operates in the same manner as that of Figure 2.

In Figure 4 there is illustrated diagrammatically a modification of the arrangement of Figure 2 or Figure 3 in which, instead of having a plan position display, a B-scope display is provided with the bearing scan controlled by pulses from the counter. Figure 4 shows only the modified part of the apparatus and, referring to this figure, there is shown a gas-filled counting tube 100 which forms part of the counter 72 of Figures 2 and 3. This counting tube has six cathodes 101—106 and the output pulses from any one of these cathodes may be selected by a selector switch 107 and fed to a bearing scan generator 108 which generates deflection currents for a deflection coil 109 of a cathode ray tube 110 forming part of a display unit 111. If the bearing scan generator 108 is of the kind requiring a trigger pulse also to terminate its bearing scan generation, such a terminating pulse may be provided by a second selector switch 112 which is also arranged to select the output from any one of the cathodes 101—106. From the cathodes 101—106, the pulses are also fed, via isolating resistors 113 and a switch 114 to a video amplifier 115 so that, if the switch 114 is closed, all the pulses in a bearing scan period are applied as bearing brightness markers to the cathode ray tube 110. The isolating resistors serve to prevent the cathodes 101—106 being short circuited when all their outputs are fed to a common point.

Apart from the modifications to the display unit and counter, the arrangement of Figure 4 may be similar to the arrangements of either Figure 2 or Figure 3, it being understood that no drive motor 16 is necessary since the scanning in Figure 4 is effected by the deflection coil 109 fed from the bearing scan generator 108 and by a range sweep deflection coil 116 fed from a range sweep generator 117.

We claim:

1. In a radar system employing a continuously rotating antenna, an alternating current generator driven in synchronism with the antenna to generate an alterating current of which the frequency is a known integral multiple greater than unity of the frequency of rotation of the antenna, an indicator having a screen on which a trace is moved in synchronism with the rotation of the antenna so that the instantaneous position of the trace on the screen is representative of the corresponding instantaneous angular position of the antenna, a pulse generator energised from said alternating current generator to produce short duration pulses in synchronism with the cycles of alternating current fed to said pulse generator, circuit means including an adjustable phase shifter for feeding alternating current from said alternating current generator to said pulse generator whereby the phase of the altenating current fed to said pulse generator for said alternating current generator may be altered, selector means arranged to select at least one pulse produced by said pulse generator in each antenna rotation to provide an antenna position marker pulse, and circuit means for applying the selected pulse to said indicator to modify the trace on the screen.

2. A radar system as claimed in claim 1 wherein said phase shifter is calibrated so that modifications on the trace can be adjusted to correspond to any desired angular position of the antenna.

3. A radar system as claimed in claim 1 wherein said selector means comprises a rotary switch having a fixed contact member and a movable contact member, the movable contact member being driven by a synchronous electric motor from the alternating current output from said phase shifter.

4. A radar system as claimed in claim 3 wherein said synchronous motor is arranged to drive the movable contact member of said switch through reduction gearing having a ratio such that, apart from variations due to movement of the phase shifter, the movable contact member is rotated at the same speed as the antenna.

5. A radar system as claimed in claim 1 wherein said selector means comprises a rotary switch having two relatively rotatable contact members, one of said contact members being coupled to said phase-shifter to be rotated through an angle equal to the angular shift of the marker pulse effected by any adjustment of the phase-shifter and the other contact member being continuously driven in synchronism with and at the same speed as the antenna.

6. A radar system as claimed in claim 5 wherein said other contact member is driven from the antenna by a magslip system.

7. A radar system as claimed in claim 1 wherein said selector means comprises a mechanically driven rotary switch arranged to interrupt a direct current control circuit during the periods necessary for passing the required bearing marker or markers, said direct current control circuit being arranged to control, by means of an electronic switch, the application of the bearing marker pulses to the indicator.

8. A radar system as claimed in claim 1 wherein said selector means comprises a counter arranged to count pulses in successive groups of pulses from said pulse generator whereby at least one out of each group may be selected, a re-set control device driven directly or indirectly from the antenna to produce a control pulse when the antenna is in a pre-determined angular position and circuit means for applying said control pulses to said counter to re-set the counter whereby counting of pulses starts when the antenna is in said pre-determined position.

9. A radar system as claimed in claim 8 wherein said re-set control device comprises a rotary switch having a fixed contact member and a movable contact member, the movable contact member being driven by a synchronous electric motor from the alternating current output from said phase shifter.

10. A radar system as claimed in claim 8 wherein said re-set control device comprises a rotary switch having two relatively rotatable contact members, one of said contact members being coupled to said phase-shifter to be rotated through an angle equal to the angular shift of the marker pulse effected by any adjustment of the phase-shifter and the other contact member being continuously driven in synchronism with and at the same speed as the antenna.

11. A radar system as claimed in claim 8 wherein said re-set control device comprises a magslip transmitter arranged so that its rotor is rotated in synchronism with and at the same speed as the antenna, a magslip receiver having its stator electrically connected to the stator of the magslip transmitter, means coupling the rotor of the magslip receiver to said phase-shifter to be rotated through an angle equal to the angular shift of the marker pulse effected by any adjustment of the phase-shifter and a control circuit arranged to produce pulses, constituting said control pulses, corresponding to one of the two characteristic nulls per revolution of the antenna of the voltage produced in the rotor of the magslip receiver.

12. A radar system as claimed in claim 8 wherein the counter is arranged to count the total number of pulses in one revolution of the antenna and wherein said re-set control device is arranged to operate, to produce a control pulse, in only one angular position in each revolution.

13. A radar system as claimed in claim 12 wherein the counter is arranged also to count pulses in groups containing equal integral sub-multiples of the total number of pulses produced in one revolution of the antenna.

14. Bearing indicating apparatus for a radar system employing a continuously rotating antenna and having a cathode ray tube with a display screen on which a trace is moved in synchronism with the rotation of the antenna, which apparatus comprises an alternating current generator mechanically driven in synchronism with the antenna through step-up gearing to generate an alternating current of which the frequency is a known integral multiple greater than unity of the frequency of rotation of the antenna, a pulse generator arranged to produce short duration pulses in synchronism with the cycles of alternating current input to the pulse generator, circuit means including an adjustable phase shifter for feeding alternating current from said alternating current generator to said pulse generator, and switch means cyclically operated in synchronism with the antenna rotation for selectively feeding selected pulses from said pulse generator to said cathode ray tube to brighten momentarily the trace on the screen of the tube.

15. Bearing indicating apparatus as claimed in claim 14 wherein means are provided for varying the phase relation of the cyclical operation of the switch means with respect to the antenna rotation.

16. In a radar system having a continuously rotating antenna and a cathode ray display tube with mechanically rotatable deflector means for rotating a trace on the screen of the tube, the combination of an alternating current generator mechanically driven in synchronism with the antenna to produce an alternating current of which the frequency is a known integral multiple greater than unity of the frequency of rotation of the antenna, a synchronous motor energized by alternating current from said alternating current generator, drive means coupling the motor to the deflector means to rotate the latter at the speed of rotation of the antenna, a pulse generator arranged to produce short duration pulses in synchronism with the cycles of alternating current input to said pulse generator, circuit means including an adjustable phase shifter for feeding alternating current from said alternating current generator to said pulse generator, and switch means cyclically operated in synchronism with the antenna rotation for selectively feeding selected pulses from said pulse generator to said cathode ray tube to brighten momentarily the trace on the screen of the tube.

17. The combination as claimed in claim 16 wherein said pulse generator is arranged to produce an output pulse for each cycle of input alternating current.

References Cited in the file of this patent

UNITED STATES PATENTS 2,488,022    Miller _____ Nov. 15, 1949